(12) United States Patent
Dussarrat et al.

(10) Patent No.: US 12,489,104 B2
(45) Date of Patent: Dec. 2, 2025

(54) PROCESSES FOR FORMING METAL OXIDE THIN FILMS ON ELECTRODE INTERPHASE CONTROL

(71) Applicant: L'Air Liquide, Société Anonyme pour l'Etude et l'Exploitation des Procédés Georges Claude, Paris (FR)

(72) Inventors: Christian Dussarrat, Tokyo (JP); Sanghoon Kim, Yokohama (JP); Sunao Kamimura, Yokosuka (JP)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 1 day.

(21) Appl. No.: 18/714,740

(22) PCT Filed: Dec. 1, 2022

(86) PCT No.: PCT/US2022/051515
§ 371 (c)(1),
(2) Date: May 30, 2024

(87) PCT Pub. No.: WO2023/102107
PCT Pub. Date: Jun. 8, 2023

(65) Prior Publication Data
US 2024/0396001 A1    Nov. 28, 2024

Related U.S. Application Data

(60) Provisional application No. 63/284,961, filed on Dec. 1, 2021.

(51) Int. Cl.
*H01M 4/04*     (2006.01)
*C23C 16/40*    (2006.01)
(Continued)

(52) U.S. Cl.
CPC ........ *H01M 4/0428* (2013.01); *C23C 16/405* (2013.01); *C23C 16/45553* (2013.01); *H01M 2004/028* (2013.01)

(58) Field of Classification Search
CPC ........ H01M 4/0428; H01M 2004/028; H01M 4/136; H01M 4/1391; H01M 4/525;
(Continued)

(56) References Cited

U.S. PATENT DOCUMENTS 8,535,832 B2    9/2013   Karthikeyan et al.
9,196,901 B2    11/2015  Se-Hee et al.
(Continued)

FOREIGN PATENT DOCUMENTS

CN    110085805    8/2019
CN    111083025    4/2020
(Continued)

OTHER PUBLICATIONS

Gordon (https://hwpi.harvard.edu/files/gordon/files/ald_precursor_chemistry_avs_ald2011.pdf), accessed online Jul. 25, 2025 (Year: 2011).*

(Continued)

*Primary Examiner* — Michael G Miller
(74) *Attorney, Agent, or Firm* — Allen E. White

(57) ABSTRACT

This invention provides a novel solution to form an artificial interphase on the electrode to protect it from fast declining electrochemical behaviors, by depositing Metal Oxides Layer, by ALD or CVD. Metals discussed here are IVA-VIA elements (Ti, Zr, Hf, V, Nb, Ta, Cr, Mo, W). The film needs to be thin, possibly discontinuous, and lithium ion conductive enough, so that the addition of this thin film interface allows fast lithium ion transfer at the interface between electrode and electrolyte.

17 Claims, 4 Drawing Sheets

(51) Int. Cl.
*C23C 16/455* (2006.01)
*H01M 4/02* (2006.01)

(58) Field of Classification Search
CPC ........ H01M 4/505; H01M 4/58; H01M 4/366;
H01M 10/0525; C23C 16/405; C23C
16/45553; Y02E 60/10
See application file for complete search history.

(56) References Cited

U.S. PATENT DOCUMENTS

| | | |
|---|---|---|
| 9,531,004 B2 | 12/2016 | Xiao et al. |
| 9,543,581 B2 | 1/2017 | Paulsen et al. |
| 9,614,224 B2 | 4/2017 | Kawakaki et al. |
| 9,837,665 B2 | 12/2017 | Dudney et al. |
| 10,177,365 B2 | 1/2019 | Mane et al. |
| 10,224,540 B2 | 3/2019 | Samarao et al. |
| 2006/0040480 A1 | 2/2006 | Derderian et al. |
| 2009/0099361 A1 | 4/2009 | Reuter et al. |
| 2015/0270539 A1 | 9/2015 | Yoshida |
| 2016/0293958 A1* | 10/2016 | Iwamoto ............... H01M 4/366 |
| 2017/0152277 A1 | 6/2017 | Lim et al. |
| 2017/0155132 A1* | 6/2017 | Kong ................. H01M 10/0525 |
| 2020/0083524 A1 | 3/2020 | Baek et al. |
| 2020/0251716 A1 | 8/2020 | Kawada et al. |

FOREIGN PATENT DOCUMENTS

| | | |
|---|---|---|
| CN | 111095614 | 5/2020 |
| CN | 111326709 | 6/2020 |
| JP | 2009 016302 | 1/2009 |
| JP | 2015 103471 | 6/2015 |
| WO | WO 2018 190374 | 10/2018 |

OTHER PUBLICATIONS

Blanquart et al., "Atomic Layer Deposition of Groups 4 and 5 Transition Metal Oxide Thin Films: Focus on Heteroleptic Precursors", Blanquart et al, Chem. Vap. Deposition 2014, 20, 189-208) (Year: 2014).*
International Search Report and Written Opinion for corresponding PCT/US2022/051515, Date.

* cited by examiner

PROCESSES FOR FORMING METAL OXIDE THIN FILMS ON ELECTRODE INTERPHASE CONTROL

CROSS REFERENCE TO RELATED APPLICATIONS

This application is a 371 of International Application No. PCT/US2022/051515, Dec. 1, 2022 which claims priority to U.S. Provisional Patent Application No. 63/284,961, filed Dec. 1, 2021, the entire contents of which are incorporated herein by reference.

BACKGROUND OF THE INVENTION

During the first cycles of a lithium-ion battery, the formation of a solid electrolyte interface (SEI) on the anode and/or on the cathode is observed from the decomposition of the electrolyte at the electrolyte/electrode interfaces. A loss of initial capacity of the lithium-ion battery results from the consumption of lithium during the formation of this SEI. In addition, the SEI layers formed are non-uniform and unstable, not efficient to passivate electrode surfaces against degradation of the electrode active materials due to a continuous decomposition of the electrolyte. SEI layers may suffer from physical cracks during battery cycles, and lithium dendrites can appear and lead to short circuits followed by thermal runaway. Furthermore the SEI layers also create a barrier potential that makes the intercalation of lithium ions in an electrode more difficult.

In current designs, lithium ion batteries have (lithium) metal oxide, phosphate or fluoride coating (e.g. $Al_xO_y$, $Li_xM_yPO_z$, M=Nb, Zr, Al Ti, etc. or $AlM_xF_y$, M=W, Y, etc.) at the surface of electrode and/or electrode active material, by means of wet coating, dry coating or sputtering of continuous films of metal oxide or/and phosphate in order to stabilize the interphase between electrode and electrolyte. Lithium-containing thin films are well-known for their use as surface coating layers of electrode materials in lithium-ion battery applications. Examples of lithium containing thin films include LiPON, lithium phosphate, lithium borate, lithium borophosphate, lithium niobate, lithium titanate, lithium zirconium oxides, etc. Surface coating of electrodes by ALD/CVD techniques is a preferred means to form an intended solid electrolyte interface thin film, hence avoiding the formation of these unstable layers. However, the vapor deposition of lithium-containing films is difficult to implement due to the lack of suitable lithium precursors for high volume manufacturing: most are not volatile or stable enough, they may contain undesirable impurities. Another important application of interphase thin films is in the formation of solid electrolyte materials used in solid-state batteries. Solid-state batteries are solvent-free systems with longer lifetime, faster charger time and higher energy density than conventional lithium-ion batteries. They are considered as the next technology step in battery development. By ALD/CVD techniques, uniform and conformal electrode/electrolyte interfacial thin films can even be obtained on complex architecture like 3D batteries.

Silicon anodes are also in the scope of the application of interphase thin films. Silicon is considered as the next generation of anode in lithium ion batteries development, providing higher specific capacity (3600 mAh $g^{-1}$) than Graphite anode (372 mAh $g^{-1}$) with the same potential level (0.2 V vs $Li^+$/Li) as Graphite anode (0.05 V vs $Li^+$/Li). The main drawback of silicon anodes is volume expansion up to 300% during charge/discharge, leading to the destabilization of SEI and physical cracks in electrodes.

The application of interphase thin films can be expanded to lithium metal anode technology. Lithium metal anodes have been considered as post lithium ion batteries (LIB) since they could provide at least 3 times more theoretical capacity compared to LIB. Lithium metal has also been highlighted owing to its high capacity (10× that of Graphite), reduced battery volume and process simplicity. However, uncontrolled lithium metal surface may lead to the growth of Li dendrite, causing a short circuit, and eventually a fire.

For next generation cathode active materials, many researches have been focused on identifying and developing metal oxide cathode materials. Among a wide range of layered oxides, Ni-rich cathode materials like NMC (lithium nickel manganese cobalt oxide) and NCA (lithium nickel cobalt aluminum oxide) are the most promising current candidates for practical applications. However, nickel-rich cathode materials tend to become amorphous when a high voltage is applied. One of the main drawbacks to these metal oxide materials, is the consecutive dissolution of the transition metals, especially nickel, due to parasite reactions of the cathode material with electrolyte. This leads to structural degradation of the cathode active material along with gas ($O_2$) release at electrode/electrolyte interface during battery charging. In addition, the dissolved nickel ions move to the anode side, and its deposition on anode surface provokes a rapid decomposition of SEI at the anode, finally leading to the failure of the battery.

Spinel cathode materials have been intensively investigated for their high rate capability and low or zero cobalt content. One of main issues with spinel cathode materials such as LMO (lithium manganese oxide), LNMO (lithium nickel manganese oxide) is the dissolution of manganese divalent ions (2 $Mn^{3+} \rightarrow Mn^{4+} + Mn^{2+}$) during battery charge process, which mostly occurs at electrode/electrolyte interface, then re-deposition on anode side and destruction of its SEI as through the same mechanism of Ni-rich cathode materials.

To address the interface issues between electrolyte and cathode electrodes such as transition metal dissolution, excessive electrolyte decomposition, thin film deposition on cathodes and/or cathode materials can be applied. For example, U.S. Pat. No. 8,535,832B2 discloses wet coating of metal oxide ($Al_2O_3$, $Bi_2O_3$, $B_2O_3$, $ZrO_2$, MgO, $Cr_2O_3$, $MgAl_2O_4$, $Ga_2O_3$, $SiO_2$, $SnO_2$, CaO, SrO, BaO, $TiO_2$, $Fe_2O_3$, $MoO_3$, $MoO_2$, $CeO_2$, $La_2O_3$, ZnO, $LiAlO_2$ or combinations thereof) onto a cathode active material comprising Ni, Mn and Co. U.S. Pat. No. 9,543,581B2 describes dry coating of amorphous $Al_2O_3$ on precursor particles of cathode active materials comprising Ni, Mn and Co elements. U.S. Pat. No. 9,614,224B2 describes a $Li_xPO_yMn_z$ coating using sputtering method on cathode active materials comprising Mn. U.S. Pat. No. 9,837,665B2 describes lithium phosphorus oxynitride (LiPON) thin films coating using sputtering method on cathode active materials comprising Li, Mn, Ni, and oxygen containing compound with a dopant of at least one of Ti, Fe, Ni, V, Cr, Cu, and Co. U.S. Pat. No. 9,196,901B2 describes $Al_2O_3$ thin films coating using an atomic layer deposition (ALD) method on cathode laminates and cathode active materials comprising Co, Mn, V, Fe, Si, or Sn and being an oxide, phosphate, silicate or a mixture of two or more thereof. U.S. Pat. No. 10,224,540B2 describes $Al_2O_3$ thin film coating using ALD method on a porous silicon anode. U.S. Pat. No. 10,177,365B2 describes $AlW_xF_y$ or $AlW_xF_yC_z$ thin film coating onto cathode active materials comprising $LiCoO_2$ using ALD. U.S. Pat. No. 9,531,004B2 describes hybrid thin films coating comprising the first layer of $Al_2O_3$, $TiO_2$, $SnO_2$, $V_2O_5$, $HfO_2$, $ZrO_2$, ZnO, and the second layer of fluoride-based coating, a carbide-based coating, and a nitride-based coating using ALD method on anode materials group consisting of: lithium titanate Li (4+x) Ti5O12, where 0≤x≤3 (LTO), graphite, silicon, silicon-containing alloys, tin-containing alloys, and combinations thereof.

BRIEF SUMMARY OF THE INVENTION

The invention provides the following solutions to form an artificial interphase on an electrode to protect it from fast declining electrochemical behaviors, by depositing Metal Oxides Layers onto the cathode or cathode active materials by ALD or CVD. These Metal Oxides Layers reduce excessive decomposition of electrolyte at the electrode/electrolyte interfaces during SEI formation, reducing capacity loss at the first cycles. The presence of such a Metal Oxides Layer also reduces the cathode active materials' transition metal cation dissolution, which is caused by parasite reactions between electrolyte and cathode active materials, then its re-deposition, on the anode. Electrochemical activity of the battery is thereby improved. As discussed above, other types of films have been proposed, especially pure metal oxides such as $Al_2O_3$. However this type of material behaves as an ion-insulator, and therefore does not allow the best electrochemical performance of the resulting cathode and battery.

The invention may be further understood in relation to the following non-limiting, exemplary embodiments described as enumerated sentences:

1. A method of coating a cathode or a cathode active material with a metal oxide film, the method comprising the steps of:
   a1. exposing the cathode or cathode active material to a chemical precursor vapor comprising a chemical precursor of the formula $M(=NR^a)(OR^b)_2(NR^c_2)$ and an oxygen source as an oxidizing co-reactant, wherein:
   M is selected from Nb, Ta, or V,
   Ra is selected from iPr, tBu, t-Am
   Rb each is independently selected from Et, iPr, tBu, sBu, SPen, and
   Rc each is independently selected from Et or Me; and
   b1. depositing the metal oxide film on the cathode or cathode active material.

2. The method of SENTENCE 1, wherein the step a1. of exposing the cathode or cathode active material to a chemical precursor vapor and the step a2. of exposing the cathode or cathode active material to a co-reactant, are sequentially performed.

3. The method of SENTENCE 2, further comprising a step a1i. of purging the chemical precursor vapor prior to step a2. of exposing the cathode or cathode active material to a co-reactant.

4. The method of SENTENCE 3, wherein the step b1. depositing the metal oxide film on the cathode or cathode active material comprises an atomic layer deposition step.

5. The method of SENTENCE 3, wherein the step b1. of depositing the metal oxide film on the cathode or cathode active material comprises a chemical vapor deposition step.

6. The method of any one of SENTENCEs 1-5, wherein the co-reactant is an oxygen source such as $O_2$, $O_3$, $H_2O$, H2O2, NO, NO2, N2O or a NOx; an oxygen-containing silicon precursor, an oxygen-containing tin precursor, a phosphate such as trimethylphosphate, diethyl phosphoramidate, or a sulfate.

7. The method of any one of SENTENCEs 1-6, wherein the precursor is of the formula $M(=NR^a)(OR^b)_2(NMeEt)$.

8. The method of any one of SENTENCEs 1-7, wherein for $R^b$ at least one is independently selected from sBu, SPen.

9. The method of any one of SENTENCEs 1-7, wherein the precursor is of the formula $M(=NR^a)(OR^b)_2(NMeEt)$ and wherein for $R^b$ at least one is independently selected from sBu, SPen.

10. The method of SENTENCE 8 or 9, wherein both $R^b$ are independently selected from sBu, SPen.

11. The method of any one of SENTENCEs 1-10, wherein the metal oxide film produced by step b1. has an average atomic composition of $Nb_xO_yD_z$, O is oxygen, and D is any other atom(s), and wherein x=0.3-0.4, y=0.4-0.65 and z=0.01-0.1.

12. The method of any one of SENTENCEs 1-11, wherein a temperature of the chemical precursor vapor and/or the cathode or cathode active material is from 100 degrees C. to 300 degrees C., more preferably 125 degrees C. to 275 degrees C., even more preferably 125 degrees C. to 175 degrees C.

13. The method of any one of SENTENCEs 1-12, wherein the metal oxide film has an average thickness of 0.02 nm to 10 nm, preferably 0.1 nm to 5 nm, most preferably 0.2 to 2 nm.

14. The method of any one of SENTENCEs 1-13, wherein the cathode active material, or the cathode active material in the cathode, is selected from the group consisting of a) layered oxides such as Ni-rich cathode materials like NMC (lithium nickel manganese cobalt oxide) and NCA (lithium nickel cobalt aluminum oxide); b) spinel cathode materials such as LMO (lithium manganese oxide), LNMO (lithium nickel manganese oxide); c) Olivine structured cathode materials, in particular the family of Olivine phosphates such as LCP (lithium cobalt phosphate), LFP (lithium iron phosphate), LNP (lithium nickel phosphate); and combinations thereof.

15. The method of any one of SENTENCEs 1-14, wherein one or more of steps a1. and b1. are performed from one to ten times, preferably one to three times, more preferably only one time.

16. The method of SENTENCE 1-15, wherein a) the temperature of the chemical precursor vapor and/or the cathode or cathode active material is from 100 degrees C. to 300 degrees C., more preferably 125 degrees C. to 275 degrees C.; b) the metal oxide film has an average thickness of 0.02 nm to 10 nm, preferably 0.1 nm to 5 nm, most preferably 0.2 to 2 nm; and c) the metal oxide film is at least 50% continuous on a surface of the cathode or cathode active material, preferably 95% or more continuous, more preferably 98% or more continuous.

BRIEF DESCRIPTION OF THE SEVERAL VIEWS OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF THE INVENTION

Figure 1:
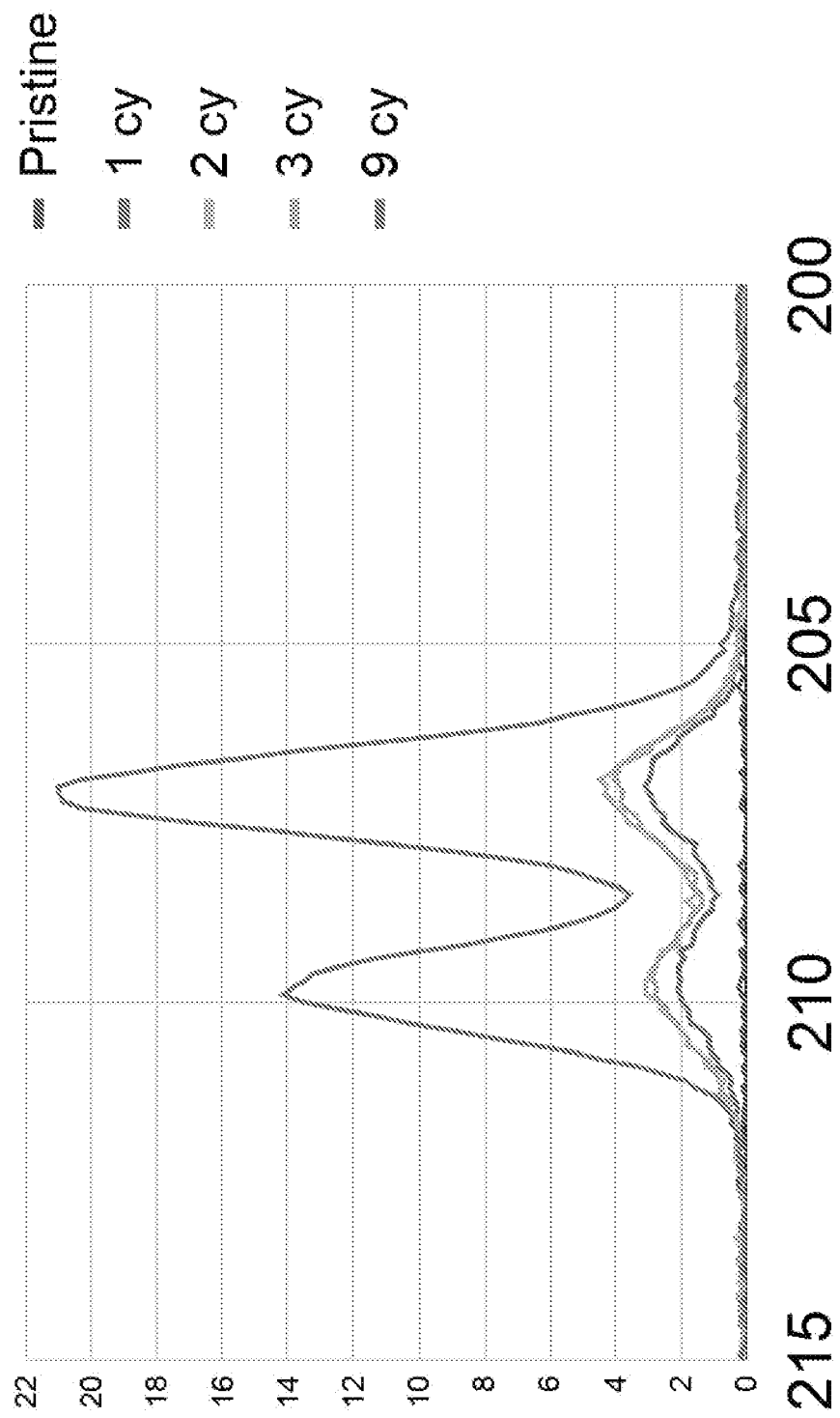
FIG. 1 shows Photoelectron spectroscopy results for NbO thin films deposition on NMC622 powder using $Nb(=NtBu)(NEt_2)(O-tBu)_2$("Nau2")/$H_2O$ using a Powder ALD (PALD) reactor.

The disclosure provides solutions to form an interphase on an electrode to protect it from fast declining electrochemical behaviors. The electrode interphase is formed on the cathode active material prior to or after its incorporation into a final cathode. The Metal Oxides Layers are formed by Chemical Vapor Deposition (CVD) or Atomic Layer Deposition (ALD) using the volatile chemical precursor genus M(=NR$^a$)(OR$^b$)$_2$(NR$^c_2$), wherein:

M is selected from Nb, Ta, or V,

R$^a$ is selected from iPr, tBu, t-Am

R$^b$ each is independently selected from Et, iPr, tBu, sBu, SPen, and

R$^c$ each is independently selected from Et or Me.

These volatile chemical precursors are supplied simultaneously, sequentially and/or by pulses of the vapor phase of the precursor. The process exploits the unexpected efficiency of the genus to achieve improved Cathode performance after fewer than nine ALD deposition cycles, preferably three or fewer cycles. This relatively low number of required ALD cycles dramatically reduces the consumption of metals, such as Nb or Ta, and the time required to process Cathodes or Cathode active materials.

"Metal Oxides" and "Metal Oxide films" as used herein means a transition metal oxide film having one or more additional elements such that the atomic ratio is MxOyDz, wherein M=the aggregate portion of transition metal(s), O is Oxygen, and D is the aggregate portion of other elements, such as Aluminum, Zinc, Tin, Carbon, Lithium, and Phosphorus. Generally, x ranges from 10 to 60%, y ranges from 10 to 60%, and z ranges from undetectable to 10%, preferably from 0 to 5%.

Preferably, M is a transition metal that forms one or more stable ions that have incompletely filled d orbitals. In particular, M is Nb, but may optionally further include one or more of Ti, Zr, Hf, V, Ta, Cr, Mo, or W.

The Metal Oxides films are formed by a CVD or ALD process to deposit the Metal Oxides Layer onto the cathode active material prior to, at an intermediate manufacturing step of the final cathode, or after its incorporation into a final cathode. The Metal Oxides films may be continuous films entirely coating the cathode active material such as by a powder ALD of a powder cathode active material prior to inclusion in the cathode. The films may be discontinuous, either by controlled deposition conditions to limit film growth or as a result of the cathode active material being incorporated in the cathode such that only part of its surface is exposed to the CVD or ALD deposition process. Generally, the Metal Oxides films have an average thickness of 0.125 to 10 nm, such as 0.125 nm to 1.25 nm, preferably 0.3 nm to 4 nm.

The Metal Oxide deposits may be deposited on an electrode such as those composed of:

a layer structured oxide, preferably a "NMC" (a lithium nickel manganese cobalt oxide such as NMC811 (Ni:Mn:Co=8:1:1) and even more NMC955 (Ni:Mn:Co=9:0.5:0.5)), a NCA (a lithium nickel cobalt aluminum oxide) or a LNO (a lithium nickel oxide);

a spinel, preferably a LNMO (a lithium nickel manganese oxide) or a LMO (a lithium manganese oxide);

an olivine (lithium metal phosphate, with metal may be iron, cobalt, manganese);

a form of carbon anode, such as graphite, doped or not;

a silicon anode, a silicon-carbon anode a tin anode, a silicon-tin anode, or lithium metal.

The deposition may be done on an electrode active material powder, on electrode active material porous materials, on different shapes of electrode active materials, or in pre-formed electrodes in which the electrode active material may be already associated with conductive carbons and/or binders and may already be supported by a current collector foil.

"Cathode" in lithium ion batteries refers to the positive electrode in an electrochemical cell (battery) where the reduction of cathode materials takes place by insertion of electrons and lithium ions during charge. During discharge. cathode materials are oxidized by releasing electrons and lithium ions. Lithium ions move from cathode to anode or vice versa within an electrochemical cell through electrolyte, while electrons are transferred through an external circuit. Cathode is generally composed of cathode active material (i.e. lithiated metal layered oxide) and conductive carbon black agent (acetylene black Super C65. Super P) and binder (PVDF, CMC).

"Cathode active materials" are the main elements in the composition of cathode (positive electrode) for battery cells. The cathode materials are, for example, cobalt, nickel and manganese in the crystal structure such as the layered structure, forms a multi-metal oxide material in which lithium is inserted. The examples of cathode active materials are layered lithium nickel manganese cobalt oxide (LiNixMnyCozO2), spinel lithium manganese oxide (LMn2O4) and olivine lithium iron phosphate (LiFePO4).

"Continuity" in relation to a coating on a surface means the percentage of that surface having any thickness of the coating material. Continuity is generally assessed optically by imaging the coated material and quantifying the proposition of surface covered by the film or not (in nm$^2$ for example), such as by a grid mapping of the surface. Electron microscopy may be used to image the surface. The amount of coverage can be expressed in terms of percent of the substrate surface area. Pinholes, gaps, or other discontinuities in the film will mean the continuity is less than 100%.

The Metal Oxides films are formed by a CVD or ALD process using the vapor(s) of the volatile chemical precursor genus M(=NR$^a$)(OR$^b$)$_2$(NR$^c_2$) and optionally one or more other chemical precursors that contribute to the final film formation. Any additional suitable precursor(s) may be selected for use based on their known applicability to the formation of Metal Oxides used for other applications.

A wide variety of optional precursors may be suitably used with Nau2, under optimized deposition conditions, to form Metal Oxides.

The Preferred IVA metal precursors are:

$M(OR)_4$ with each R is independently a C1-C6 carbon chain (linear or branched), most preferably $M(OMe)_4$, $M(OiPr)_4$, $M(OtBu)_4$, $M(OsBu)_4$ $M(NR^1R^2)_4$ with each $R^1$ and $R^2$ are independently a C1-C6 carbon chain (linear or branched), most preferably $M(NMe_2)_4$, $M(NMeEt)_4$, $M(NEt_2)_4$ $ML(NR^1R^2)_3$ with L represents an unsubstituted or substituted allyl, cyclopentadienyl, pentadienyl, hexadienyl, cyclohexadienyl, cycloheptadienyl, cyclooctadienyl and each $R^1$ and $R^2$ are independently a C1-C6 carbon chain (linear or branched), most preferably $MCp(NMe_2)_3$, $M(MeCp)(NMe_2)_3$, $M(EtCp)(NEt_2)_3$, $MCp^*(NMe_2)_3$, $MCp(NMe_2)_3$, $M(MeCp)(NMe_2)_3$, $M(EtCp)(NEt_2)_3$, $MCp^*(NMe_2)_3$, $M(iPrCp)(NMe_2)_3$, $M(sBuCp)(NMe_2)_3$, $M(tBuCp)(NMe_2)_3$, $N(secPenCp)(NMe_2)_3$, $M(nPrCp)(NMe_2)_3$ $ML(OR)_3$ with L represents an unsubstituted or substituted allyl. cyclopentadienyl, pentadienyl, hexadienyl, cyclohexadienyl, cycloheptadienyl, cyclooctadienyl and each R is independently a C1-C6 carbon chain (linear or branched), most preferably $MCp(OiPr)_3$, $M(MeCp)(OiPr)_3$, $M(EtCp)(OEt)_3$, $MCp^*(OEt)_3$, $M(iPrCp)(NMe_2)_3$, $M(sBuCp)(NMe_2)_3$, $M(tBuCp)(NMe_2)_3$, $N(secPenCp)(NMe_2)_3$, $M(nPrCp)(NMe_2)_3$ Preferred VA metal precursors are:

$M(OR)_5$ with each R is independently a C1-C6 carbon chain (linear or branched), most preferably $M(OEt)_5$, $M(OiPr)_5$, $M(OtBu)_5$, $M(OsBu)_5$. $M(NR^1R^2)_5$ with each $R^1$ and $R^2$ are independently a C1-C6 carbon chain (linear or branched), most preferably $M(NMe_2)_5$, $M(NMeEt)_5$, $M(NEt_2)_5$ $ML(NR^1R^2)_x$ with x=3 or 4, L represents an unsubstituted or substituted allyl, cyclopentadienyl, pentadienyl, hexadienyl, cyclohexadienyl, cycloheptadienyl, cyclooctadienyl or a imide of the form N—R and each $R^1$ and $R^2$ are independently a C1-C6 carbon chain (linear or branched), most preferably $MCp(NMe_2)_3$, $M(MeCp)(NMe_2)_3$, $M(EtCp)(NEt_2)_3$, $MCp^*(NMe_2)_3$, $M(=NtBu)(NMe_2)_3$, $M(=NtAm)(NMe_2)_3$, $M(=NtBu)(NEt_2)_3$, $M(=NtBu)(NEtMe)_3$, $M(=NiPr)(NEtMe)_3$.

$M(=NR^1)L(NR^2R^3)_x$ with x=1 or 2, L represents an unsubstituted or substituted allyl, cyclopentadienyl, pentadienyl, hexadienyl, cyclohexadienyl, cycloheptadienyl, cyclooctadienyl and each $R^1$ and $R^2$ and $R^3$ are independently a C1-C6 carbon chain, most preferably $MCp(=NtBu)(NMe_2)_2$, $M(MeCp)(N=tBu)(NMe_2)_2$, $M(EtCp)(N=tBu)(NMe_2)_2$, $MCp^*(=NtBu)(NMe_2)_2$, $MCp(=NtBu)(NEtMe)_2$, $M(MeCp)(N=tBu)(NEtMe)_2$, $M(EtCp)(N=tBu)(NEtMe)_2$.

$ML(OR)_x$ with x=3 or 4, L represents an unsubstituted or substituted allyl, cyclopentadienyl, pentadienyl, hexadienyl, cyclohexadienyl, cycloheptadienyl, cyclooctadienyl or a imide of the form N—R, with each R is independently a C1-C6 carbon chain (linear or branched), most preferably $MCp(OiPr)_3$, $M(MeCp)(OiPr)_3$, $M(EtCp)(OEt)_3$, $MCp^*(OEt)_3$, $M(=NtBu)(OiPr)_3$, $M(=NtAm)(OiPr)_3$, $ML(OR)_x(NR^1R^2)_y$ with x and y independently equal to 1 or 2, L represents an unsubstituted or substituted allyl, cyclopentadienyl, pentadienyl, hexadienyl, cylohexadienyl, cycloheptadienyl, cyclooctadienyl or a imide of the form N—R, with each R is independently a C1-C6 carbon chain (linear or branched), most preferably $MCp(OiPr)_2(NMe_2)$, $M(MeCp)(OiPr)_2(NMe_2)$, $M(EtCp)(OEt)_2(NMe_2)$, $M(=NtBu)(OiPr)_2(NMe_2)$, $M(=NtBu)(OiPr)(NMe_2)_2$, $M(=NtBu)(OiPr)_2(NMe_2)$, $M(=NtBu)(OiPr)_2(NEtMe)$, $M(=NtBu)(OiPr)_2(NEt_2)$, $M(=NtBu)(OEt)_2(NMe_2)$, $M(=NtBu)(OEt)_2(NEtMe)$, $M(=NtBu)(OEt)_2(NEt_2)$, $M(=NiPr)(OiPr)_2(NMe_2)$, $M(=NiPr)(OiPr)_2(NMe_2)_2$, $M(=NiPr)(OiPr)_2(NEtMe)$, $M(=NiPr)(OiPr)_2(NEt_2)$, $M(=NiPr)(OEt)_2(NMe_2)$, $M(=NiPr)(OEt)_2(NEtMe)$, or $M(=NiPr)(OEt)_2(NEt_2)$.

Preferred VIA metal precursors are:

$M(OR)_6$ with each R is independently a C1-C6 carbon chain (linear or branched), most preferably $M(OEt)_5$, $M(OiPr)_5$, $M(OtBu)_5$, $M(OsBu)_5$ $M(NR^1R^2)_6$ with each $R^1$ and $R^2$ are independently a C1-C6 carbon chain (linear or branched), most preferably $M(NMe_2)_6$, $M(NMeEt)_6$, $M(NEt_2)_6$ $M(NR^1R^2)_xL_y$ with x and y being independently equal to 1 to 4, L represents an unsubstituted or substituted allyl, cyclopentadienyl, pentadienyl, hexadienyl, cyclohexadienyl, cycloheptadienyl, cyclooctadienyl or a imide of the form N—R and each $R^1$ and $R^2$ are independently a C1-C6 carbon chain (linear or branched), most preferably $MCp(NMe_2)_3$, $M(MeCp)(NMe_2)_3$, $M(EtCp)(NEt_2)_3$, $MCp^*(NMe_2)_3 M(=NtBu)_2(NMe_2)_2$, $M(=NtAm)_2(NMe_2)_2$, $M(=NtBu)(NEt_2)_2$.

$M(OR)_x(NR^1R^2)_yL_z$ ML with x, y and z being independently equal to 0 to 4, L represents an unsubstituted or substituted allyl, cyclopentadienyl, pentadienyl, hexadienyl, cyclohexadienyl, cycloheptadienyl, cyclooctadienyl or a imide of the form N—R, with each R is independently a C1-C6 carbon chain (linear or branched), most preferably $MCp(OiPr)_3$, $M(MeCp)(OiPr)_3$, $M(EtCp)(OEt)_3$, $M(=NtBu)_2(OiPr)_2$, $M(=NtAm)_2(OiPr)_2$, $M(=NtBu)_2(OtBu)_2$, $M(=NiPr)_2(OtBu)_2$, $M(=NtBu)_2(OiPr)_2$, $M(=NiPr)_2(OiPr)_2$.

$M(=O)_xL_y$, with x, y and z being independently equal to 0 to 4, L represents an unsubstituted or substituted allyl, cyclopentadienyl, pentadienyl, hexadienyl, cyclohexadienyl, cycloheptadienyl, cyclooctadienyl, amide or a imide of the form N—R, with each R is independently a C1-C6 carbon chain (linear or branched), most preferably $M(=O)_2(OtBu)_2$, $M(=O)_2(OiPr)_2$, $M(=O)_2(OsecBu)_2$, $M(=O)_2(OsecPen)_2$, $M(=O)_2(NMe_2)_2$, $M(=O)_2(NEt_2)_2$, $M(=O)_2(NiPr_2)_2$, $M(=O)_2(NnPr_2)_2$, $M(=O)_2(NEtMe)_2$, $M(=O)_2(NPen_2)_2$.

The Metal Oxides films may be formed using one member of the volatile chemical precursor genus as a single precursor or in a combination with one or more other precursors, in either case optionally with an oxidizing co-reactant (if needed or desired). One of skill in the art is able to select the appropriate additional precursor(s) and co-reactants from those known in the art to produce the Metal Oxides films with the desired composition when used under optimized deposition conditions to "tune" the composition of the metal oxides. Exemplary guidance on various precursor options include:

Oxygen may come from an O-source such as $O_2$, $O_3$, $H_2O$, $H_2O_2$, NO, NO2, N2O or a NOx Oxygen may come from a dopant source such as an oxygen-containing silicon precursor, as an oxygen-containing tin precursor, a phosphate such as trimethylphosphate, diethyl phosphoramidate, or a sulfate.

Nitrogen may come from a N-source such as $N_2$, $NH_3$, $N_2H_4$, N2H4-containing mixtures, an alkyl hydrazine, NO, NO2, N2O or a NOx.

Nitrogen may come from a dopant source such as an nitrogen-containing silicon precursor, as an nitrogen-containing tin precursor, or a phosphate such as diethyl phosphoramidate.

Carbon may come from a C-source such as an hydrocarbon, carbon-containing silicon precursor, a carbon-containing tin precursor, a carbon-containing boron precursor, a carbon containing aluminum precursor, a carbon-containing phosphorus precursor, a phosphate such as trimethylphosphate, diethyl phosphoramidate, or a sulfate.

Silicon may come from a Si-source such as a silane or a silicon-containing organometallic precursor.

Tin may come from a Sn-source such as a stannane or a tin-containing organometallic precursor.

Aluminum may come from an Al-source such as an alane, including alkyl alanes, or an aluminum-containing organometallic precursor.

Phosphorus may come from a phosphine, including an organic phosphine or a phosphate such as trimethylphosphate or diethyl phosphoramidate.

Sulfur may come from a S-source such as a sulfur, S8, H2S, H2S2, SO2, an organic sulfite, a sulphate, or a sulfur-containing organometallic precursor.

The first row transition metals may come from known organometallics or other precursors suitable for use in vapor deposition.

EXAMPLES

Examples 1-5: Deposition and Electrochemical Performances of NbO Thin Films Deposited Using Nau2/$H_2O$ on NMC622 Powder at 250° C.

Experimental Conditions for Deposit/Film Formation:

The number of cycles on NMC622 electrodes or NMC powder are typically limited to 20 ALD cycles, corresponding to about 1.5 to 4 ångströms, a thickness insufficient to perform film composition. Such characterizations were therefore performed on films deposited with $O_3$ after 300 ALD cycles on blank silicon wafers. The corresponding growth rate and film composition by X-ray Photoelectron Spectrometer (XPS) are:

GPC ~2.96 Å. Nb: ~38.7%, O: ~54.8%, C: ~3%, N: ~2%, Si ~1.4%.

The refractive index of these films is 2.38.

Depositions were performed on NMC622 powder using a fluidized bed reactor in the following experimental conditions:

| ALD conditions for ALD | |
|---|---|
| Reactor set temperature | 250° C. |
| Reactor pressure | ~40 Torr |
| Cycle # | 1/2/3/9 cy |
| Precursor & gas | |
| Nautilus2 canister Temp. | 100° C. |
| Nautilus2 canister Press. | 50 Torr |
| N2 bubbling in Nautilus2 | 20 sccm |
| O3 FR | 20 sccm |
| N2 push/purge | ~120 sccm |
| Pulse sequence | |
| Nautilus2 (2 sccm) | 900 sec |
| Purge | 1040 sec |
| H2O | 180 sec |
| Purge | 1040 sec |
| Loaded substrate | |
| 5 g of NMC622 powder | |

The chemical precursor in these examples is Nb(=NtBu)(NEt$_2$)(O-tBu)$_2$ ("Nau2").

Figure 2:
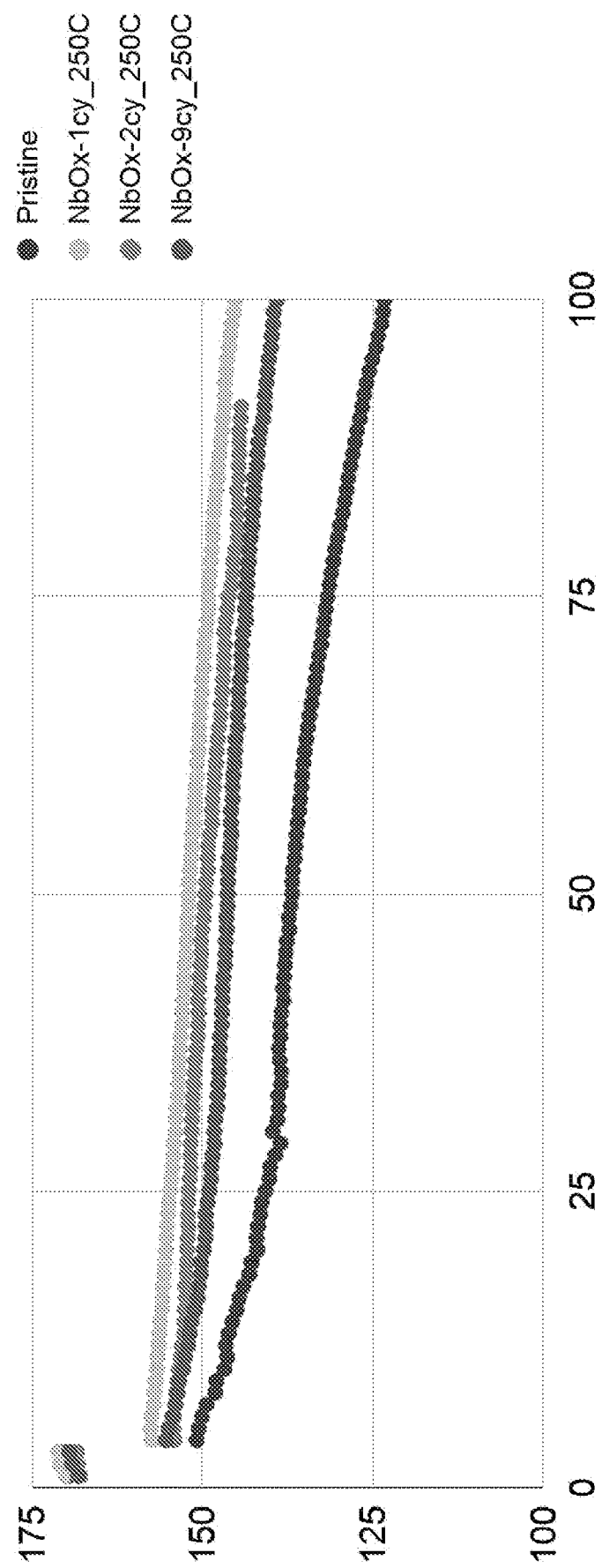
FIG. 2 shows a normalized C-rate performance for NbO thin films deposited on NMC622 powder using $Nb(=NtBu)$ (NEt$_2$)(O-tBu)$_2$/H$_2$O in a Powder ALD (PALD) reactor (normalization to their original discharge capacity at 0.2 C)
Figure 3:
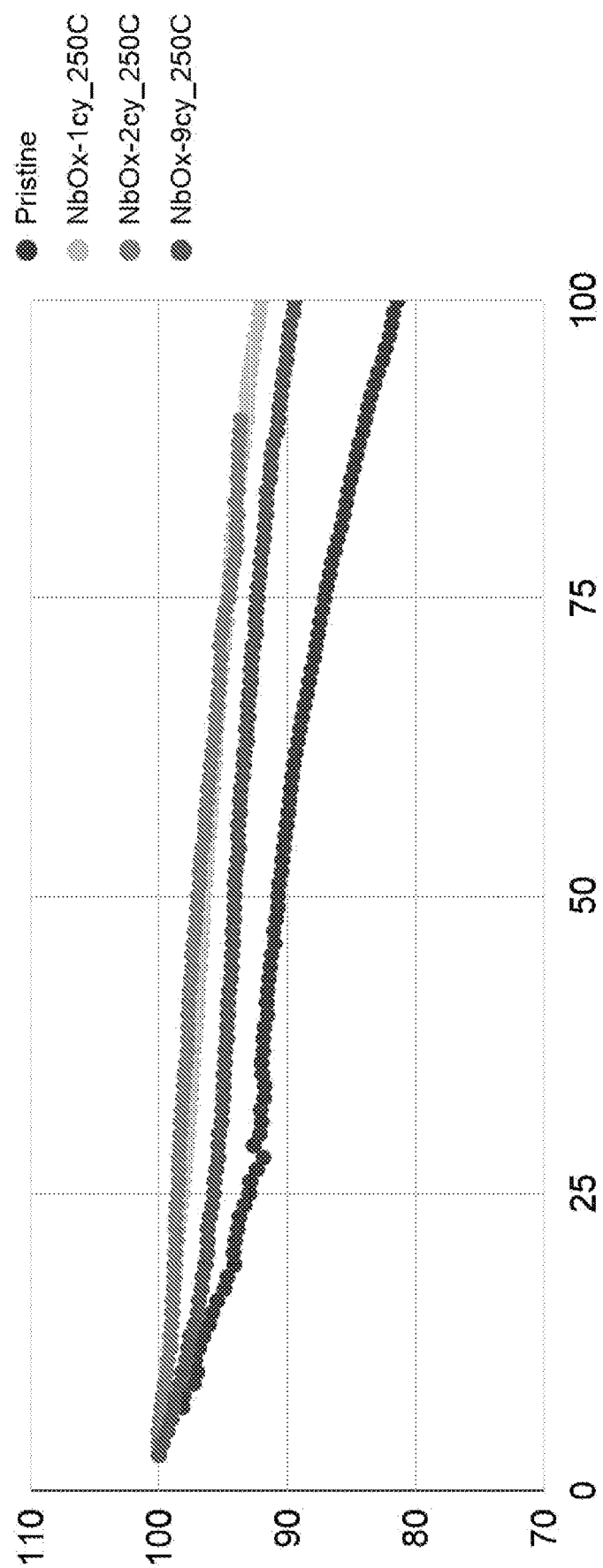
FIG. 3 shows the long term cycling performance for NbO thin films deposited on NMC622 powder using Nb(=NtBu)(NEt$_2$)(O-tBu)$_2$/H$_2$O in a Powder ALD (PALD) reactor.
Figure 4:
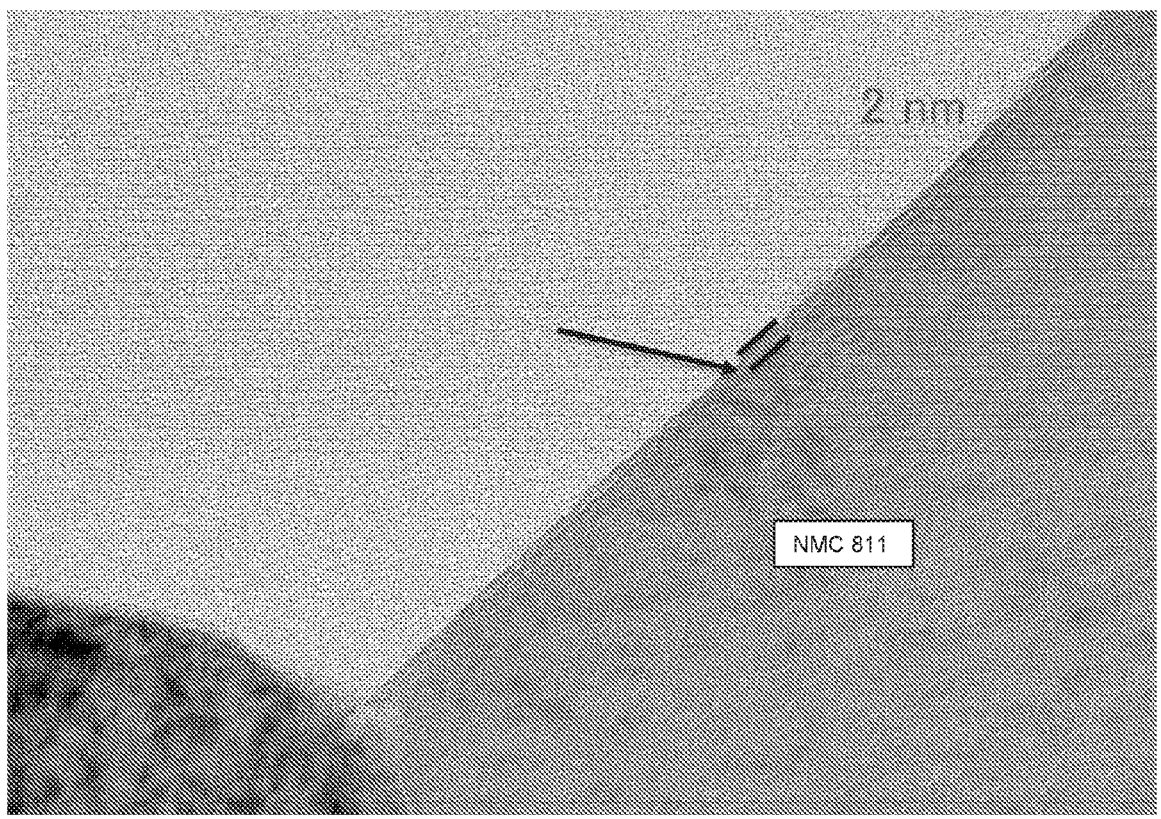
FIG. 4 shows an electron micrograph of NMC 811 powder coated with a layer of NbO after 3 ALD cycles using the AL conditions described in the Examples herein below. The layer is identified by the arrow with a section also bracketed by bars. The layer is visually verified as continuous and conformal with a thickness of approximately 1.5 nm-2 nm. Conformal coverage and the Nb content of the layer were further verified by Energy-Dispersive X-ray Spectroscopy (not shown).

Electrochemical characterizations:
Experimental conditions:
Battery cell conditions:
  Cathode material: NMC622
    ~5 mg/cm$^2$ loading
    No calendering
  Coating material: $Nb_2O_5$
    Precursor: Nautilus2
    Co-reactant: $O_3$ or $H_2O$
    Dep. T=250° C.
    Powder reactor P<40 torr
    Coated powder quantity: 5 g
    Reactor filling: x %
  Membrane: Celgate 2400
  Neat electrolyte: 1M LiPF$_6$
    in EC: EMC (1:1 wt)
  Anode material: Li metal
Measurement conditions:
  Temperature: 26° C.
  3 pre-cycles at 0.2C, then 1C
  Voltage: 3.0~4.3 V, CC As seen in FIG. 1, the quantity of Niobium deposited as Niobium Oxide increases from one ALD cycle to 2-3 ALD cycles and the dramatically increases with nine ALD cycles. The effect of these Niobium Oxide deposits are shown in FIGS. 2 and 3. Battery performance is significantly enhanced compared to an uncoated control. However, quite unexpectedly, a single ALD cycle produces the best results although 2-3 cycles are close to the same. 9 ALD cycles does still improve performance compared to the control, but not as well as 1-3 cycles. Normally, ALD coatings for Cathode active materials requires 5-20 ALD cycles for optimal benefit. Nau2 surprisingly enables a low ALD cycle process that requires much less time and much lower precursor quantities per unit of cathode active materials. This will result in significant cost savings in industrial use.

The same conditions and tests were used for ALD using Ozone in place of water. The Ozone results were the same as with water, demonstrating that the low cycle number deposition was not substantially influenced by the oxidizer used.

Similar TGA and DTA properties were measured for the Ta analog Ta(=NtBu)(NEt$_2$)(O-tBu)$_2$. Depositions at 200 cycles with $O_3$ on a silicon wafer, likewise produces similar results as seen for Nb(=NtBu)(NEt$_2$)(O-tBu)$_2$. At 275 degrees C., growth rate was 4.69 angstrom/cycle with a composition Ta: 32.8%, O: 56.5%, and C: 8.1%. Based on these results, it is expected that 1-9 cycles of ALD for cathode or cathode material coating will produce benefits in electrode performance similar to those demonstrated for Nau2 above.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties; as well as for the specific information for which each is cited.

The invention claimed is:

1. A method of coating a cathode or a cathode active material with a metal oxide film, the method comprising the steps of:
   a1. exposing the cathode or cathode active material to a chemical precursor vapor comprising a precursor of the formula $M(=NR^a)(OR^b)_2(NR^2_2)$ and an oxygen source as an oxidizing co-reactant, and
   b1. depositing the metal oxide film on the cathode or cathode active material,
   wherein:
   M is selected from Nb, Ta, or V,
   $R^a$ is selected from iPr, tBu, t-Am
   $R^b$ each is independently selected from Et, iPr, tBu, sBu or SPen, and
   $R^c$ each is independently selected from Et or Me.

2. The method of claim 1, wherein the precursor is of the formula $M(=NR^a)(OR^b)_2(NMeEt)$.

3. The method of claim 2, further comprising a step of purging the chemical precursor vapor prior to step of exposing the cathode or cathode active material to a co-reactant.

4. The method of claim 1, wherein for $R^b$ at least one is independently selected from sBu or SPen.

5. The method of claim 4, wherein both $R^b$ are independently selected from sBu or SPen.

6. The method of claim 4, wherein the step b1. depositing the metal oxide film on the cathode or cathode active material comprises an atomic layer deposition step.

7. The method of claim 4, wherein the step b1. of depositing the metal oxide film on the cathode or cathode active material comprises a chemical vapor deposition step.

8. The method of claim 1, wherein the precursor is of the formula $M(=NR^a)(OR^b)_2(NMeEt)$ and wherein for $R^b$ at least one is independently selected from sBu or SPen.

9. The method of claim 1, wherein the precursor is $Nb(=NtBu)(NEt_2)(O-tBu)_2$, $Nb(=NtBu)(NEt_2)_2(O-tBu)$, $Ta(=NtBu)(NEt_2)(O-tBu)_2$, $Ta(=NtBu)(NEt_2)_2(O-tBu)$, and mixtures thereof.

10. The method of claim 1, wherein the step of exposing the cathode or cathode active material to a chemical precursor vapor and the step of exposing the cathode or cathode active material to a co-reactant, are sequentially performed.

11. The method of claim 1, wherein the co-reactant is an oxygen source; an oxygen-containing silicon precursor, an oxygen-containing tin precursor, a phosphate, diethyl phosphoramidate, or a sulfate.

12. The method of claim 1, wherein the metal oxide film produced by step b1. has an average atomic composition of $Nb_xO_yD_z$, O is oxygen, and D is any other atom(s), and wherein x=0.3-0.4, y=0.4-0.65 and z=0.01-0.1.

13. The method of claim 1, wherein a temperature of the chemical precursor vapor and/or the cathode or cathode active material is from 125 degrees C. to 275 degrees C.

14. The method of claim 12, wherein the metal oxide film has an average thickness of 0.02 nm to 10 nm.

15. The method of claim 1, wherein the cathode active material, or the cathode active material in the cathode, is selected from the group consisting of a) layered oxides; b) spinel cathode materials; c) Olivine structured cathode materials,; and combinations thereof.

16. The method of claim 1, wherein one or more of steps a1. and b1. are performed from one to ten times.

17. The method of claim 16, wherein a) the temperature of the chemical precursor vapor and/or the cathode or cathode active material is from 100 degrees C. to 300 degrees C.; b) the metal oxide film has an average thickness of 0.02 nm to 10 nm; and c) the metal oxide film is at least 50% continuous on a surface of the cathode or cathode active material.

* * * * *